US011865723B2

United States Patent
Goldfarb et al.

(10) Patent No.: US 11,865,723 B2
(45) Date of Patent: Jan. 9, 2024

(54) CONTROL METHOD FOR A ROBOTIC SYSTEM

(71) Applicant: Vanderbilt University, Nashville, TN (US)

(72) Inventors: Michael Goldfarb, Nashville, TN (US); Andres Martinez-Guerra, Nashville, TN (US); Brian Lawson, Nashville, TN (US)

(73) Assignee: Vanderbilt University, Nashville, TN (US)

( * ) Notice: Subject to any disclaimer, the term of this patent is extended or adjusted under 35 U.S.C. 154(b) by 734 days.

(21) Appl. No.: 17/040,075

(22) PCT Filed: Apr. 30, 2019

(86) PCT No.: PCT/US2019/030048
§ 371 (c)(1),
(2) Date: Sep. 22, 2020

(87) PCT Pub. No.: WO2019/213164
PCT Pub. Date: Nov. 7, 2019

(65) Prior Publication Data
US 2021/0370508 A1      Dec. 2, 2021

Related U.S. Application Data

(60) Provisional application No. 62/664,439, filed on Apr. 30, 2018.

(51) Int. Cl.
*B25J 9/16* (2006.01)
*B25J 9/00* (2006.01)

(52) U.S. Cl.
CPC .......... *B25J 9/1664* (2013.01); *B25J 9/1633* (2013.01); *B25J 9/1651* (2013.01); *B25J 9/1653* (2013.01); *B25J 9/0006* (2013.01)

(58) Field of Classification Search
CPC ...... B25J 9/1664; B25J 9/1633; B25J 9/1651; B25J 9/1653; B25J 9/0006
See application file for complete search history.

(56) References Cited

U.S. PATENT DOCUMENTS 7,330,777 B2   2/2008   Hashimoto
8,972,057 B1   3/2015   Freeman
(Continued)

FOREIGN PATENT DOCUMENTS

WO   WO 2011/067621 A1   6/2011

OTHER PUBLICATIONS

Li, P.Y. & Horowitz, R., "Passive Velocity Field Control of Mechanical Manipulators," IEEE Transactions on Robotics and Automation, 15(4): 751-763 (1999).

(Continued)

*Primary Examiner* — Jeff A Burke
*Assistant Examiner* — Mohamad O El Sayah
(74) *Attorney, Agent, or Firm* — Nixon Peabody LLP

(57) ABSTRACT

An exemplary robotic system includes a plurality of controllable joints and a controller. An exemplary control method provides for controlling the controllable joints by the controller. The control method provides for determining a configuration space for the robotic system and determining a reference movement path within the configuration space. The control method then provides for assigning a plurality of streamlines in the configuration space to yield a flow field based on the reference movement path. The control method then provides for measuring actual velocity vectors of the robotic system in the configuration space. The control method then provides for determining an error velocity vector based on a difference between the actual velocity vector and the desired velocity vector given by the flow field corresponding to the current robot configuration. The con- (Continued)

trol method then provides for applying a total control vector at the plurality of controllable joints, by the controller, based on the error velocity vector.

14 Claims, 8 Drawing Sheets

(56) References Cited

U.S. PATENT DOCUMENTS

| | | | |
|---|---|---|---|
| 2003/0030397 A1* | 2/2003 | Simmons | G06F 3/011 318/568.11 |
| 2011/0208355 A1 | 8/2011 | Tsusaka | |
| 2011/0271469 A1 | 11/2011 | Ziegler | |
| 2012/0130538 A1* | 5/2012 | Riener | G05B 19/423 700/245 |
| 2015/0142130 A1* | 5/2015 | Goldfarb | A61H 3/00 623/25 |
| 2016/0000511 A1* | 1/2016 | Hoffmann | B25J 9/1628 606/130 |
| 2018/0264647 A1* | 9/2018 | Sato | B25J 9/1653 |
| 2018/0360639 A1* | 12/2018 | Gregg | B25J 9/1638 |
| 2020/0009730 A1* | 1/2020 | Henriksson | G05B 19/423 |
| 2021/0128248 A1* | 5/2021 | Cohen | A61B 18/14 |

OTHER PUBLICATIONS

Martinez, A. et al., "A Controller for Guiding Leg Movement during Overground Walking with a Lower Limb Exoskeleton," IEEE Transactions on Robotics, 34(1): 183-193 (2018).

International Preliminary Report on Patentability in International Application No. PCT/US2019/030048, dated Jul. 17, 2019 (6 pages).

International Search Report and Written Opinion in International Application No. PCT/US2019/030048, dated Jul. 17, 2019 (9 pages).

Extended European Search Report in European Patent Application No. Ep 19796400.0, dated Dec. 16, 2021 (9 pages).

* cited by examiner

CONTROL METHOD FOR A ROBOTIC SYSTEM

CROSS REFERENCE TO RELATED APPLICATION

This application is a U.S. National Stage Entry of International Application No. PCT/US2019/030048, filed Apr. 30, 2019, which claims priority under 35 U.S.C. § 119 to U.S. Provisional Application No. 62/664,439, entitled "FLOW CONTROL FOR EXOSKELETON ASSISTANCE," and filed on Apr. 30, 2018. The contents of those applications are hereby incorporated by reference in their entireties.

GOVERNMENT SUPPORT

This invention was made with government support under award number W81XWH-15-2-0068 awarded by the Department of Defense. The government has certain rights in the invention.

FIELD

The present disclosure relates to a flow controller for an orthotic system.

BACKGROUND

Many robotic systems involve cooperative physical interaction between a robotic system and another independently-controlled entity, such as a human collaborator. For example, a person and robot may wish to cooperatively perform a task or movement. Conventional systems and methods, which allow cooperative movement, often store energy (i.e., potential energy) in the control action. This energy is stored in conventional robotic systems as a result of a discrepancy between motion associated with the robot, and motion associated with the human collaborator. In conventional systems, this energy causes a "spring-like" characteristic in the robotic control system. This control energy can be returned to the human collaborator and presents a potential danger to him or her.

For example, in many robot control systems, the control action includes, either primarily or in part, a component that provides a restoring action in relation to the error between a desired position of the robot and the actual position. This creates a potential energy, which is effectively "stored" in the robot controller. In the absence of a restraining force, conventional robots effectively spring back to a desired position or configuration. If a human collaborator is interacting with this type of controller, the virtual energy stored in the robot controller can be released suddenly, resulting in sudden movement of the robot that is potentially harmful to the environment or the human collaborator.

SUMMARY

The various examples of the present disclosure are directed towards a control method for generating a desired movement in a robotic system. In a first embodiment, the robotic system includes a plurality of controllable joints and a controller. The control method provides for determining a configuration space for the robotic system. The configuration space includes dimensionality equal to a number of the plurality of controllable joints. The control method then provides for determining, at the controller, a reference movement path within the configuration space. The control method then provides for assigning a plurality of streamlines in the configuration space to yield a flow field. Each of the plurality of streamlines converges to the reference movement path and includes a velocity magnitude. The control method then provides for measuring an actual velocity vector in the configuration space. The measurement of the actual velocity vector is based on a plurality of velocity components corresponding to the plurality of controllable joints. The control method then provides for determining an error velocity vector based on a difference between the actual velocity vector and the desired velocity vector, as determined by the orientation and magnitude of the streamlines at the present location of the flow field in the configuration space. The control method then provides for applying a total control vector at the plurality of controllable joints, by the controller, based on the error velocity vector.

In some embodiments, applying the total control vector includes receiving a drag coefficient at the controller. The control method then provides for determining the total control vector based on a product of the at least one drag coefficient and the error velocity vector. The control method then provides for applying torque or force at each joint of the plurality of controllable joints based on the total control vector.

In some examples, the applied total control vector for each joint is a dot product of the total control vector and the axis associated with each joint.

In some examples, the applied total control vector is strictly dissipative relative to the flow field.

In some examples, streamlines in the plurality of streamlines include identical velocity magnitudes.

In some examples, the drag coefficient includes an axial drag coefficient in a first direction tangential to the plurality of streamlines and a lateral drag coefficient in a second direction normal to the plurality of streamlines.

In some examples, determining the total control vector further includes identifying a first component of the error velocity vector and a second component of the error velocity vector. The first component of the error velocity vector is in the first direction and the second component of the error velocity vector is in the second direction. The control method then provides for determining a first component of the total control vector and a second component of the total control vector. The first component of the total control vector is equal to a product of the axial drag coefficient and the first component of the error velocity vector. The second component of the total control vector is equal to a product of the lateral drag efficient and the second component of the error velocity vector. The control method then provides for determining a combined control vector comprising a vector sum of the first component of the total control vector and the second component of the total control vector.

In some examples, the total control vector for each joint is a dot product of the combined control vector and a controllable degree of freedom associated with each joint.

Another exemplary embodiment of the present disclosure provides a control method for generating desired method in a robotic system with a plurality of joints, wherein some joints are controllable and some are not controllable. The control method provides for determining a configuration space for the robotic system. The configuration space includes dimensionality equal to a number of the joints. The control method then provides for determining, at the controller, a reference movement path within the configuration space. The control method then provides for assigning a plurality of streamlines in the configuration space to yield a flow field. Each of the plurality of streamlines converges to the reference movement path and includes a velocity magnitude. The control method then provides for measuring an actual velocity vector in the configuration space; the measurement of the actual velocity vector is based on a plurality of velocity components corresponding to controllable joints. The control method then provides for determining an error velocity vector based on a difference between the actual velocity vector and selected streamlines in the plurality of streamlines. The selected streamlines are those streamlines with a corresponding location in the configuration space to the actual velocity vector. The control method then provides for applying a total control vector at the controllable joints, by the controller, based on the error velocity vector. Additional examples of this embodiment are as provided for above with respect to the first embodiment.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims.

BRIEF DESCRIPTION OF THE DRAWINGS

The accompanying drawings exemplify the embodiments of the present invention and, together with the description, serve to explain and illustrate principles of the invention. The drawings are intended to illustrate major features of the exemplary embodiments in a diagrammatic manner. The drawings are not intended to depict every feature of actual embodiments nor relative dimensions of the depicted elements, and are not drawn to scale.

DETAILED DESCRIPTION

Figure 1:
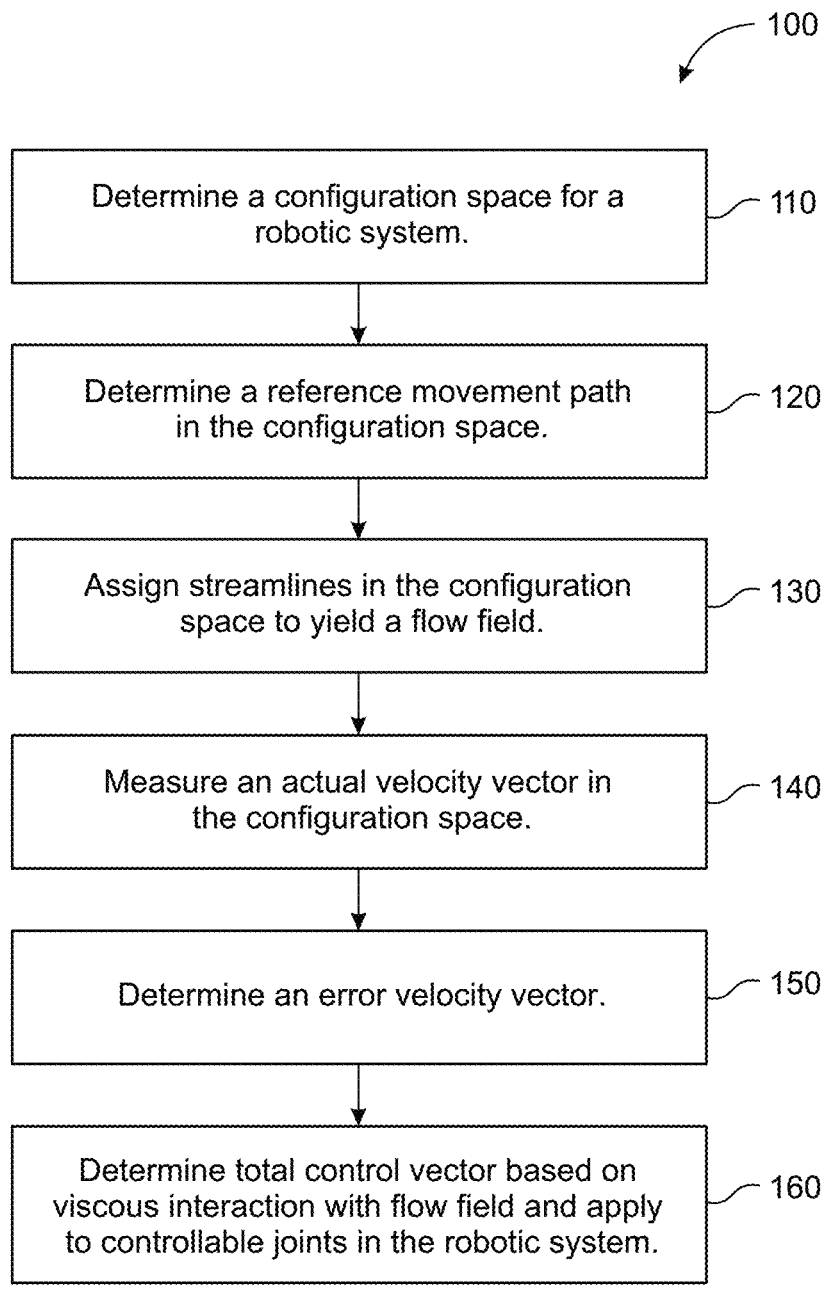
FIG. 1 shows an exemplary control methodology, according to one method of the present disclosure.

The present invention is described with reference to the attached figures, where like reference numerals are used throughout the figures to designate similar or equivalent elements. The figures are not drawn to scale, and are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details, or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

The present disclosure is directed to controlling a robotic system that interacts physically with a human collaborator. Specifically, the controller provides movement assistance, movement guidance, and discrepancy forgiveness, without storing potential energy in the control field (i.e., without a term that is algebraically related to the positional error between the actual position and desired position). The controller achieves these behaviors by simulating the interaction between a viscous fluid flow field and a passive object submersed in the flow field. Specifically, the desired robot motion is represented in the controller as a flow current moving through a viscous fluid. The effective action of the controller on the robotic system is the same as the viscous fluid forces that act on an object "floating" in a fluid. Just as a floating object will be carried downstream with the current, so too is the configuration of the robot manipulator.

An exemplary exoskeleton controller can be configured to offer these characteristics by simulating a fluid flow field that influences limb movement via virtual viscous interaction between a virtual flow field and the user's legs. The controller is referred to herein as a flow controller. The virtual flow field refers to a flow field assigned in a configuration space based on a reference movement path. Because the disclosed flow controller does not store potential energy as a function of path error, the disclosed flow controller is inherently more forgiving than a path-based approach, as conventionally used (discussed further below). The absence of such potential energy storage reduces the effect of previous path errors on the control effort, and results in a controller with a smaller disturbance transfer function.

The disclosed control method allows a person to have agency over the precise course of movement when using a robotic system. In such cases, the robot will provide assistance and guidance, but ultimately yield to the actual movement path and timing determined by the person. As such, robots, according to embodiments of the present disclosure, provide movement assistance to encourage a given movement, without regard to the precise time basis of that movement. Robots, according to embodiments of the present disclosure, also allow deviations from the predetermined path programmed into the robot.

Lower-Limb Exoskeleton Design

Lower-limb exoskeletons include wearable robotic systems that provide lower limb movement assistance during overground locomotion without offering overhead body weight support. These lower-limb exoskeletons are assistive systems for individuals with mobility impairment. Conventional control methods for such exoskeletons do not provide balance control, but rather rely on the user to maintain balance during locomotion. This reliance on the user reduces the liability associated with the system, engenders greater trust of the system from the user, and reduces the number of required actuated degrees-of-freedom in the system.

With regard to balance, a first type of application can be considered where the primary means of balance control is through the user's upper body, and a second type of application can be considered where the primary means of balance control is through the user's lower body. The former, herein called upper-limb User-Balance-Control (UBC), is applicable to individuals with severe lower-limb neuromuscular impairment but with minor or no upper-limb neuromuscular impairment (e.g., individuals with motor-complete paraplegia). Such individuals are likely non-ambulatory without using an exoskeleton or other assistive system, and require the use of a bilateral stability aid such as a rolling walker or a pair of forearm crutches to maintain balance when using an exoskeleton. The second type of balance control, herein called lower-limb UBC, is relevant to individuals with non-severe lower-limb neuromuscular impairment, such as persons with multiple sclerosis (MS), cerebral palsy (CP), incomplete spinal cord injury (iSCI), or hemiparesis from stroke. Such individuals may use a stability aid such as a quad cane to walk, but are generally able to walk without using an exoskeleton or other assistive system. Such individuals are regarded as poorly-ambulatory, and the objective of the exoskeleton is to improve the quality of their legged locomotion.

The distinction between upper-limb UBC and lower-limb UBC for overground walking is important with respect to how a lower-limb exoskeleton provides movement assistance. In the case of upper-limb UBC, an exemplary exoskeleton, according to the present disclosure, need not cooperate with user-generated lower-limb efforts, and therefore has complete control authority with regard to leg movement. Accordingly, many conventional hip and knee exoskeleton control methods described for use with upper-limb UBC applications are of a predetermined trajectory-control type.

Although upper-limb UBC approaches are effective for walking assistance in non-ambulatory individuals, they are generally not appropriate for applications involving lower-limb UBC (i.e., for use with poorly-ambulatory individuals). In the case of lower-limb UBC, the individuals use their lower-limb neuromuscular system to provide movement, and perhaps more importantly to provide control of balance. As such, an exemplary exoskeleton, according to the present disclosure, should provide movement assistance to the user (to facilitate improved locomotion), but must ultimately cede lower-limb control authority to the user for purposes of balance control. Alternatively stated, the exemplary exoskeleton and control method, according to the present disclosure, should: 1) supplement movement effort (i.e., provide assistance); 2) encourage a desired inter-joint coordination (i.e., provide guidance); and 3) allow a user to deviate as needed from the nominal inter-joint coordination as required to maintain balance (i.e., be forgiving to deviation from a nominal motion).

Various control methods have been proposed in the prior art to provide some aspects of these control objectives. These controllers can be loosely associated with one of two approaches: 1) oscillator-based approaches; and 2) potential-energy-based path approaches. Oscillator-based approaches allow variation in step time and/or length (i.e., are forgiving), but do not provide inter-joint coordination (i.e., do not provide guidance). As such, they provide two of the three aforementioned objectives. Path-based approaches provide inter-joint coordination (i.e., guidance), and also allow step-time variation (i.e., are forgiving in terms of step time). Path-based approaches, however, do not provide assistance (although assistive components can be separately included), and more importantly are not forgiving to step-length variation. As a result, these path approaches can create a trip hazard.

Exemplary Methodology and Systems

Methodology 100 of FIG. 1 provides an exemplary control method for generating movement in a robotic system. An exemplary robotic system includes system 200A of FIGS. 2A-2B and any other robotic, orthotic, and/or exoskeletal devices as known in the art that provide physical assistance to or interaction with a user. In some examples, the exemplary robotic system includes a plurality of controllable joints and a controller, which executes the steps of methodology 100. In other examples, the exemplary robotic system includes a plurality of joints, some of which are controllable and some of which are not controllable, and a controller, which executes the steps of methodology 100. As readily apparent to one skilled in the art, various steps of methodology 100 can be omitted, added onto, or completed in a different order. Additional details and examples of methodology 100 are discussed with greater detail below with respect to the flow controller discussion.

Methodology 100 begins at step 110 and provides for determining a configuration space for the robotic system. The configuration space includes dimensionality equal to a number of the plurality of controllable joints.

Methodology 100 then provides, at step 120, for determining, at the controller, a reference movement path within the configuration space. In some examples of step 120, the reference movement path is pre-loaded into the controller, or is provided by the user before step 110. In some examples of step 120, there are multiple reference movement paths, and the controller determines which reference movement path is appropriate based on actual movement of the robotic system. For example, the controller receives movement data from a plurality of sensors on the robotic system and matches the movement data to a reference movement path which would provide similar movement data. In some examples, the reference movement path is determined by user input, for example, by the user pushing a button or making a selection on smartphone communicatively coupled to the robotic system.

Methodology 100 then provides, at step 130, for assigning a plurality of streamlines in the configuration space to yield a flow field. Each of the plurality of streamlines converges to the reference movement path and includes a velocity magnitude. In some examples of step 130, all streamlines in the plurality of streamlines include identical velocity magnitudes.

Methodology 100 then provides, at step 140, for measuring an actual velocity vector in the configuration space. The measurement of the actual velocity vector is based on a plurality of velocity components corresponding to the plurality of controllable joints.

Methodology 100 then provides, at step 150, for determining an error velocity vector based on a difference between the actual velocity vector, and the velocity vector of the flow field corresponding to the current (measured) location in the configuration space.

Methodology 100 then provides, at step 160, for applying a total control vector at the plurality of controllable joints, by the controller, based on the error velocity vector.

In an exemplary embodiment, step 160 includes receiving a drag coefficient at the controller and for determining the total control vector based on a product of the drag coefficient and the error velocity vector. Torque or force is then applied at each joint of the plurality of controllable joints based on the total control vector. In some examples, the torque or force applied is strictly dissipative relative to the flow field. In some examples, the drag coefficient includes an axial drag coefficient in a first direction tangential to the plurality of streamlines and a lateral drag coefficient in a second direction normal to the plurality of streamlines. In some examples, multiple drag coefficients are received at the controller.

In some examples of step 160, the applied total control vector for each joint is a dot product of the total control vector and an axis associated with each joint.

In some examples, determining the total control vector further includes identifying a first component of the error velocity vector and a second component of the error velocity vector. The first component of the error velocity vector is in the first direction and the second component of the error velocity vector is in the second direction. The total control vector then includes a first component and a second component. The first component of the total control vector is equal to a product of the axial drag coefficient and the first component of the error velocity vector. The second component of the total control vector is equal to a product of the lateral drag efficient and the second component of the error velocity vector. A combined control vector is then determined by a vector sum of the first component of the total control vector and the second component of the total control vector. This combined control vector is applied at the controllable joints in the robotic system.

In some examples of step 160, the total control vector for each joint is a dot product of the combined control vector and a controllable degree of freedom associated with each joint.

Figures 2A, 2B:
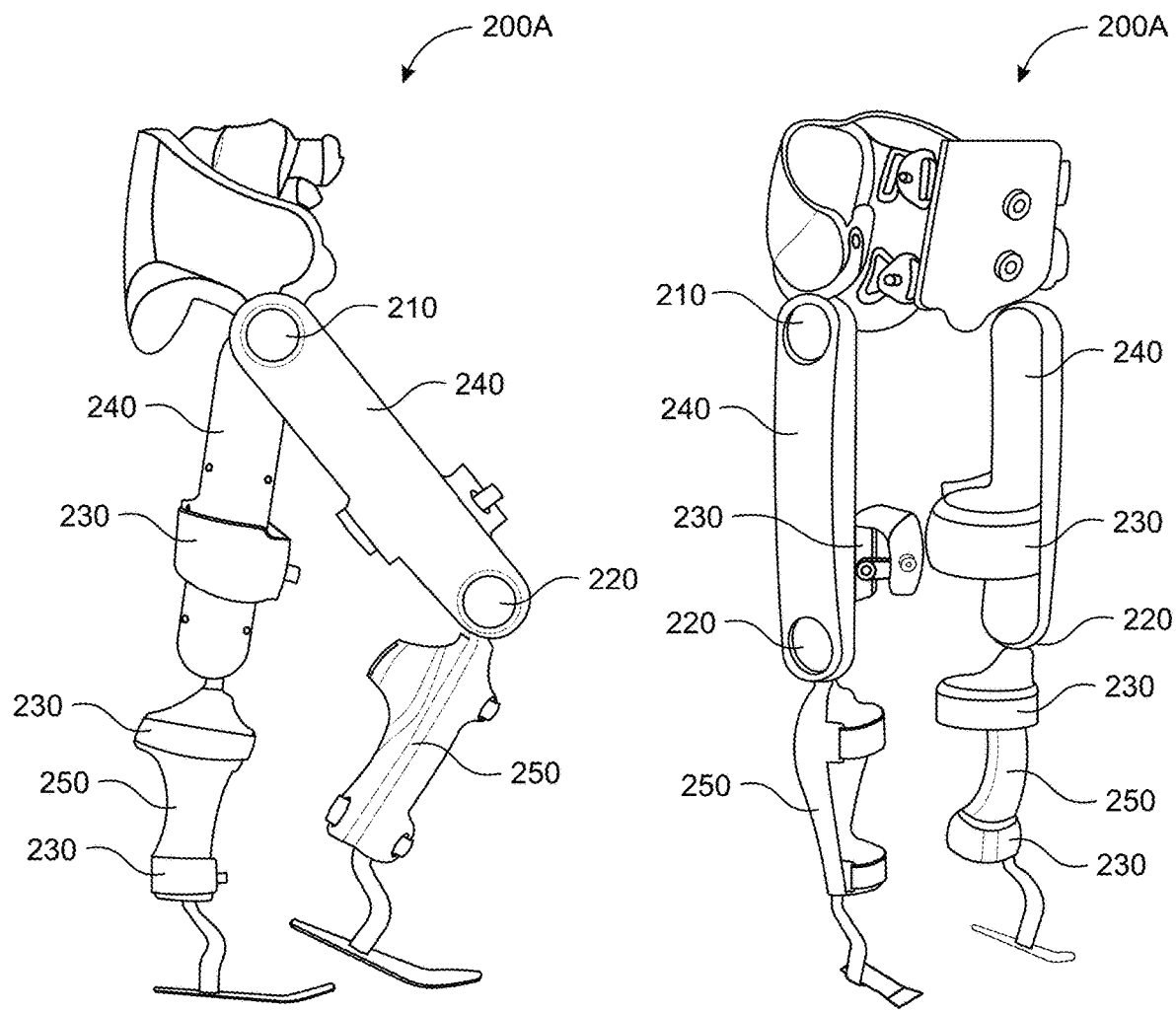
FIG. 2A shows an exemplary exoskeleton in a generally side view, according to an embodiment of the present disclosure.
FIG. 2B shows the exemplary exoskeleton of FIG. 2A in a generally front view.

In one embodiment of the present disclosure, the disclosed control method (e.g., methodology 100 of FIG. 1) is used to control a lower-limb exoskeleton with unilateral or bilateral sagittal-plane hip and knee assistance (i.e., exoskeletons that provide ipsilateral inter-joint coordination). FIGS. 2A-2B show an exemplary system 200A which includes thigh joints 210, knee joints 220, receiving elements 230, thigh supports 240, and calf supports 250. FIG. 2A shows a generally side view of system 200A and FIG. 2B shows a generally front view of system 200A.

Exemplary system 200A includes two controllable joints for each leg and no non-controllable joints. The controllable joints are the thigh joints 210 and the knee joints 220. A controller (not shown) is communicatively coupled to the thigh joints 210 and the knee joints 220 and is configured to apply torque or force to the joint. The controller applies torque or force to the joint in response to a methodology, for example, methodology 100 of FIG. 1, or any other methodology discussed herein.

System 200A affixes to a user via receiving elements 230. Receiving elements 230 along thigh supports 240 receive a thigh of a user, and receiving elements 230 along calf supports 250 receive a calf a user. Receiving elements 230 therefore secure a user in system 200A, such that system 200A provides assistive support to a user when used according to the methodologies disclosed herein.

In some examples, any locations on system 200A includes a plurality of sensors (not shown). The plurality of sensors can be on the thigh joints 210, knee joints 220, receiving elements 230, thigh supports 240, and calf supports 250. The sensors can be configured to detect movement and can include, for example, accelerometers. In some examples, the sensors are communicatively coupled to the controller.

Flow Controller Properties

An exemplary control method is described in a configuration joint space. The configuration joint space (or, "configuration space") is a virtual space consisting of n dimensions, where n is equal to the number of controllable joints. For example, in the case of a non-redundant spatial manipulator, n=6 such that all 6 spatial degrees of freedom can be controlled independently. There is no restriction on the integer value of n, however, in other robotic systems which include greater or fewer controllable joints. The following vector is defined to represent the current state of the robotic system:

$$\vec{\theta} = (\theta_0, \theta_1, \ldots, \theta_{(n-1)}). \quad (1)$$

The vector $\vec{\theta}$ is herein referred to as the configuration of the robotic system. The time derivative of the configuration is given by differentiation of the components:

$$\vec{\omega} = \frac{d\vec{\theta}}{dt}, \quad (2)$$

Although $\vec{\omega}$ does not represent a spatial velocity (as it is expressed in the configuration space and is of dimension n), it is herein referred to as the velocity due to its analogous nature.

In this control method, a desired set of configurations forms a "path" in the configuration space (again using an analogy to spatial movement). In order to implement this control methodology, the designer selects a nominal desired path which will serve as the reference movement path for the controller. At any given point in time, one particular point along the path, called $\vec{\theta}_c$, will be closest to the current configuration (in the sense of a Euclidean norm). The definition of $\vec{\theta}_c$ enables the expression of a configuration error, $\vec{e}$, as defined below:

$$\vec{e} = \vec{\theta}_c - \vec{\theta} \quad (3)$$

A local normal and tangential coordinate frame can be defined such that:

$$\hat{n} = \frac{\vec{e}}{|\vec{e}|}, \quad (4)$$

and the resulting tangential direction is complementary to the normal and points in the direction of positive path traversal. As a result, this decomposition instantaneously reduces the control problem to a dimensionality of 2, although, in general, the direction of $\hat{n}$ changes with time.

The control law that is implemented derives from a virtual flow field shaped according to the desired path. The homogeneous (i.e., characteristic) behavior of the controller depends strictly on velocity error, and is therefore devoid of potential-type energy storage. Movement guidance is enforced through the shape of the flow field (i.e., which is an exogenous input, since the shape of the flow field is not affected by system state), while the homogeneous behavior of the control law is strictly viscous-type behavior. The control law is thus written as follows:

$$\vec{\tau} = C_d(\vec{\omega}_{ref} - \vec{\omega}). \quad (5)$$

where (5) emulates the flow force on a symmetric body due to drag when immersed in a viscous fluid. $C_d$ is equivalent to a drag coefficient, while $\vec{\omega}_{ref}$ is an instance of the flow field in the configuration space based on the instance of the closest point on the desired path, $\vec{\theta}_c$. $\vec{\tau}$ is selected to represent the control effort because it is the traditional symbol for torque, and most robotic manipulators are composed primarily of revolute joints, although forces can be substituted directly in this equation. Note that the control action (5) can alternatively be described as the drag on a non-symmetric body. For example, assuming a non-symmetric body characterized by two drag coefficients, an axial and transverse drag coefficient respectively, and assuming the body is aligned within the flow field such that the axial axis of the body is aligned with the streamline, the total control action is given by the vector sum of the axial drag component and the transverse drag component.

This control method is not dependent on a specific construction of a flow field shape, and, in general, can be employed with any flow field construction. In general, however, the flow field converges monotonically into the reference movement path (or the "desired path") within the configuration space. In one embodiment of flow field construction, written as a function of the configuration error and expressed in terms of the normal and tangential components defined previously, the flow field is given by:

$$\vec{\omega}_{ref} = \begin{cases} \Gamma\left(|\vec{e}|\hat{n} + \dfrac{k_{sh}}{|\vec{e}|}\hat{t}\right), & \text{for } |\vec{e}| > 0 \\ \Gamma \hat{t}, & \text{for } |\vec{e}| = 0 \end{cases} \quad (6)$$

where the scalar $\Gamma$ determines the magnitude of the velocity reference.

$$|\vec{e}|\hat{n} + \dfrac{k_{sh}}{|\vec{e}|}\hat{t}$$

is normalized after eq. (6) is calculated, such that $\vec{\omega}_{ref}$ is a unit vector multiplied by $\Gamma$. Because the flow field is constant, the flow field only changes direction throughout the configuration space. The control torque, however, changes in magnitude as the time derivative of the configuration changes. In other words, when the robotic system moves in the same direction and with the same velocity as the flow field, the control torques are zero. The second parameter, $k_{sh}$, affects the shape of the flow field in relation to the reference movement path. A large $k_{sh}$ favors tangential flow and produces a flow field that mostly provides control torque along the reference movement path independent of the magnitude of deviation from the reference movement path. A small $k_{sh}$ favors normal flow and produces a flow field that primarily redirects the configuration back to the reference movement path for large deviations, but then provides assistance along the reference movement path when the configuration error is small.

In some examples, not all degrees of freedom in the configuration space of the robotic system are controllable degrees of freedom. In this case, the control derivation remains the same (i.e., equations 1-5), except that the control actions associated with the non-controlled degrees of freedom are not used. In the simplest example, consider a two degree of freedom system with one non-controlled degree of freedom and one controlled degree of freedom. In this case, the configuration space is a two-dimensional space, the desired path is a curve in this two-dimensional space, and the virtual flow field also exists in this two-dimensional space. The control action is therefore resolved into a two-component vector; however, only the component associated with the control action is used (i.e., the component associated with the non-controlled degree of freedom is effectively a member of the control null-space). The physical equivalent of this circumstance (for the two degree of freedom case) is that of an infinitely asymmetric object, floating in a flow field, where the axes of the object remain always aligned with respective axes of the configuration space. The physical equivalent is not as clearly represented when this concept is extended to an arbitrary number of controlled and uncontrolled degrees of freedom.

Exemplary Implementation Using a Hip Joint and a Knee Joint

Figure 3:
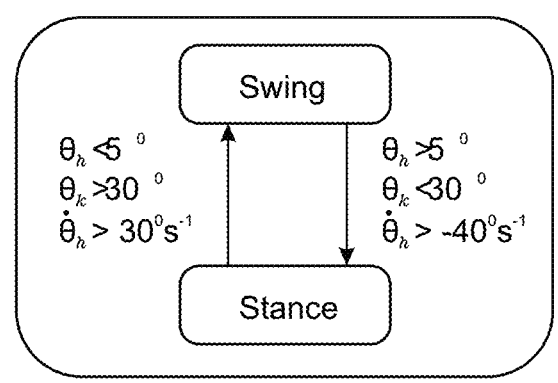
FIG. 3 shows an exemplary controller state machine diagram, according to an embodiment of the present disclosure.

FIG. 3 shows an exemplary controller state machine diagram for a leg with both a hip joint and a knee joint. The controller is configured to switch between a stance state and a swing state based on an angle $\theta_h$, corresponding to an angle between a thigh section of a robotic system and a torso of a user, and an angle $\theta_k$, corresponding to an angle between a thigh section of a robotic system and a calf section of a robotic system. In this implementation, the exoskeleton provided guidance in the swing phase only (i.e., the stance phase behavior provided knee extension support only). As such, the controller comparison presented subsequently applies only to swing-phase motion.

Figure 4A:
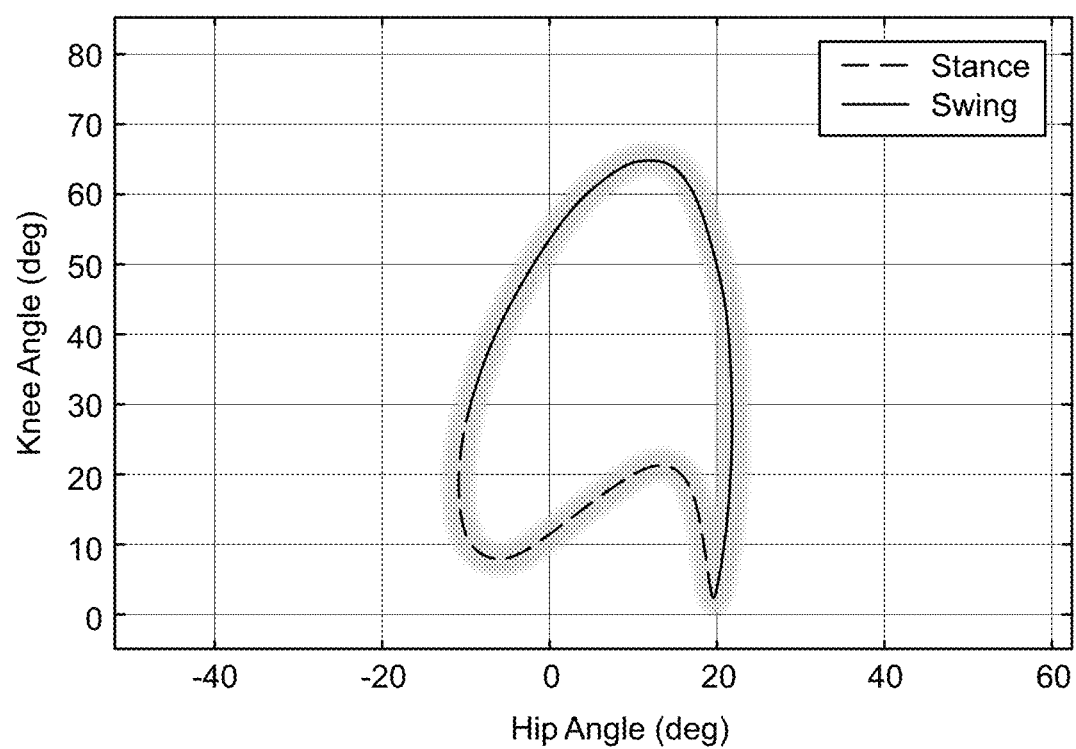
FIG. 4A shows an exemplary reference movement path, according to an embodiment of the present disclosure.

FIG. 4A shows an exemplary reference movement path, as can be used in various methodologies according to the embodiments of the present disclosure. The reference movement path shown in FIG. 4A corresponds to healthy walking.

Figure 4B:
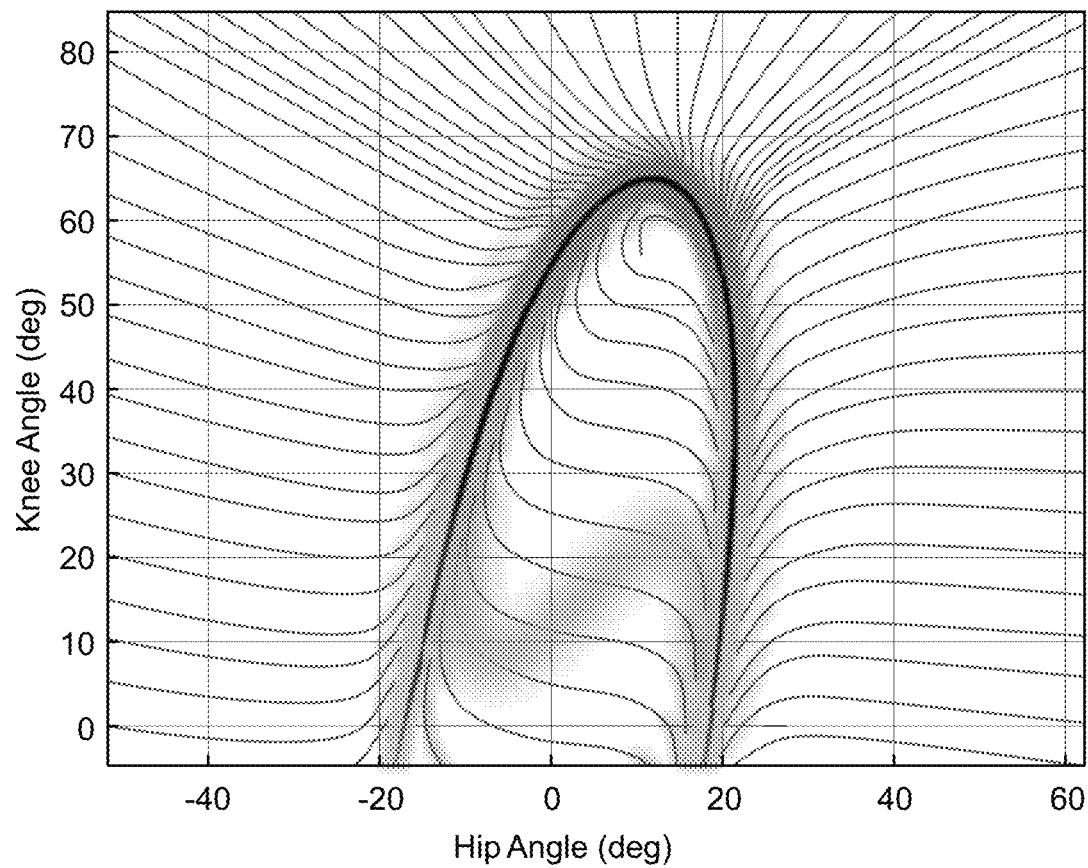
FIG. 4B shows an exemplary flow field, according to an embodiment of the present disclosure.

FIG. 4B shows an exemplary flow field, according to the various embodiments of the present disclosure. The flow field includes a plurality of streamlines associated with the reference movement path shown in FIG. 4A.

Experimental Protocol

In the experiments, three swing-phase guidance controllers were implemented on an open-architecture version of a commercially available lower-limb exoskeleton. The three controllers were: 1) a conventional "path" type controller with low elastic gains, called the path-3 controller; 2) a conventional "path" type controller with high elastic gains, called the path-9 controller; and 3) the flow controller, implemented with gains that provided equivalent guidance to the path-9 controller, and equivalent forgiveness to the path-3 controller, as subsequently described. Each controller was programmed with software written in accordance with conventional path controllers and an exemplary flow controller, according to embodiments of the present disclosure, as previously described above. The exoskeleton hardware platform incorporates four motors for powered movement of bilateral hip and knee joints in the sagittal plane, in addition to built-in ankle foot orthoses at both ankle joints to provide ankle stability and transfer the weight of the exoskeleton to the ground. Onboard electronic sensors include encoders at each joint that provide the respective joint angles and angular velocities, and six-axis inertial measurement units (IMUs) in each thigh link. The total mass of the exoskeleton including the battery was 12 kg (26 lbs).

Two sets of experiments were performed to comparatively assess the efficacy of the path and flow controllers. The first experiments assessed each controller's ability to provide guidance, which was assessed via average root-mean-squared (RMS) path error during swing phase. The second experiment assessed each controller's tolerance for path deviation, which was assessed by measuring the "disturbance gain." This is essentially the measured output impedance of the controller in response to large path deviations.

The path controller, described in detail in Martinez et al 2018 (Martinez Guerra, A., Lawson, B. E., Goldfarb, M. "*A Controller for Guiding Leg Movement during Overground Walking with a Lower Limb Exoskeleton*," IEEE Transactions on Robotics, vol. 34, no. 1, pp. 183-193, 2018), employed three essential gains: stiffness k, damping b, and deadband half-width δ. The flow controller also employed three essential gains: field shaping gain $k_{sh}$, velocity reference magnitude Γ, and drag coefficient Cd. Both controllers had a trade-off between the guidance error and disturbance gain; in particular, higher control gains generally result in less guidance error, but also a larger disturbance gain. As such, an equitable comparison requires a systematic selection of control gains. To provide an equitable comparison in this regard, the two controllers were compared for two cases. In the first case, gains were selected to provide similar guidance error between the two controllers and then the respective disturbance gains were compared. In the second case, gains were selected to provide a similar disturbance response for the two controllers and then the respective guidance errors were compared. In both cases, the flow controller gains remained invariant, such that only the path controller gains changed, as discussed below. The gains that define each of these controllers are given in Table 1.

TABLE 1

Controller Gains

| Controller | Parameter | Magnitude |
|---|---|---|
| Path-9 | k | 515 Nm/rad (9 Nm/deg) |
|  | b | 13.0 Nm-s/rad (0.225 Nm-s/deg) |
|  | δ | 0.026 rad 91.5 deg) |
| Flow | $k_{sh}$ | 16 |
|  | Γ | 2.9 rad/s (167 deg/s) |
|  | Cd | 0.75 Nm-s/rad (0.013 Nm-s/deg) |
| Path-3 | k | 172 Nm/rad 93 Nm/deg) |
|  | b | 8.0 Nm-s/rad (0.14 Nm-s/deg) |
|  | δ | 0.026 rad (91.5 deg) |

As such, two experiments were performed under three control conditions: using the path-9 controller, the flow controller, and the path-3 controller. The first experiment measured the RMS guidance error, while the second experiment measured the disturbance gain. Experiments were performed on five healthy subjects (three male, two female, aged 25.8+3.7 years) walking overground in the exoskeleton.

Guidance Assessments

For each subject, the guidance assessment experiments consisted of six 50 meter overground exoskeleton walks without a stability aid at a speed of approximately 0.8 m/s, where each controller (i.e., path-9, path-3, and flow) was used twice in a semi-random order, with the constraint that the same controller could not be presented to each subject consecutively. Each subject was required to complete the 50 m walking segment in a time of 6.25 s+2.5 s, which corresponds to an average walking speed between 0.77 and 0.83 m/s. If the 50 meter walk time was out of this range, the data was discarded and the trial repeated later in the protocol such that the subjects did not use the same controller consecutively.

Disturbance Assessments

The disturbance assessment experiments consisted of overground exoskeleton walking, with the additional constraint that each subject wore a range-of-motion (ROM) limiting knee brace (Breg model T Scope Premier Post-Op) under the exoskeleton on the right leg to prevent full knee flexion. The knee brace was locked such that subjects' maximum knee flexion was limited to approximately 40 degrees in the configuration space. Subjects were given a rolling walker as a stability aid for these trials. Rather than 50 meter, each subject walked 25 strides using each controller (path-3, path-9, and flow) one time each, presented in a random order. There was no attempt to regulate walking speed in these trials.

Results/Data

During all trials, data were collected from the exoskeleton, including bilateral hip and knee angles and motor torques, at a sampling rate of 200 Hz. For all trials, the first three strides and the last two strides for each leg were not included in the results to avoid transient effects associated with the start and end of the walking trials.

Subjects were allowed to acclimate to each trial condition prior to conducting the experiments. Acclimation consisted of a minimum of four 50 meter walks with the exoskeleton with no controller active (i.e., backdriving exoskeleton joints). Afterwards, subjects were required to walk a minimum of three 50 meter walks using each of three controllers (i.e., path-3, path-9, and flow). Subjects could walk as many additional trials as desired, until they confirmed that they were acclimated to all experimental conditions associated with the guidance assessments. Note that subjects were not explicitly exposed to the disturbance experimental condition (i.e., wearing the ROM-limiting knee brace) prior to that experiment.

Stance-phase stiffness was not employed in the healthy-subject experiments. Since the stance-phase behavior provides support to prevent buckling, it was not needed by healthy subjects (they have no stance phase support deficiency). The absence of stance-phase functionality is not expected to have an effect on the experiment results. As such, for the healthy-subject experiments described here, the controllers were active strictly during the swing phase of walking.

Experimental Data

Figure 5A:
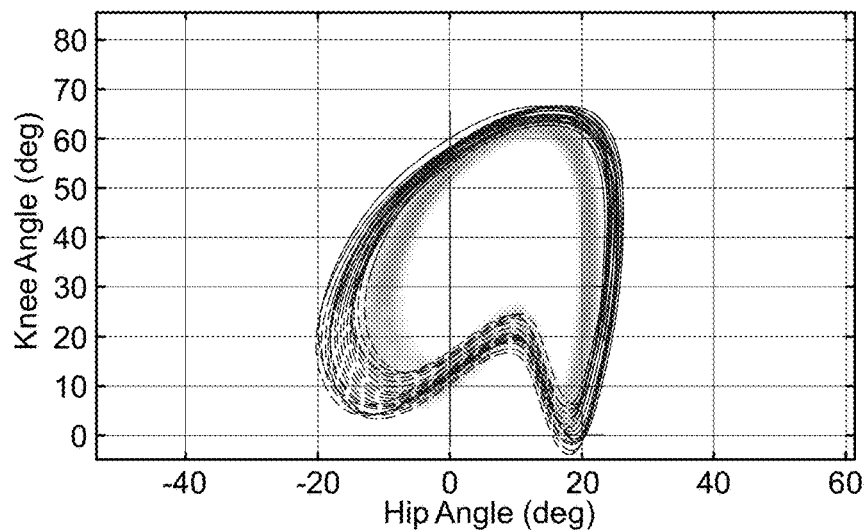
FIG. 5A shows exemplary leg motion data collected by an experimental methodology, according to an embodiment of the present disclosure.
Figure 5B:
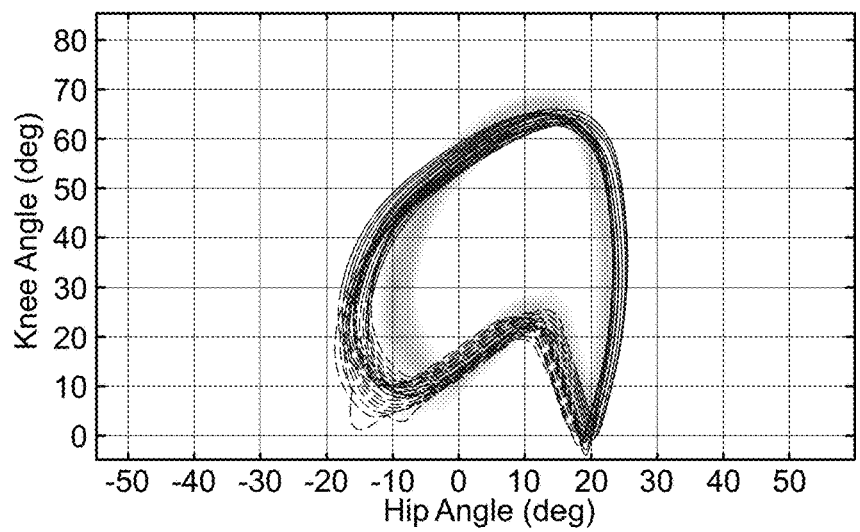
FIG. 5B shows exemplary leg motion data collected by an experimental methodology, according to an embodiment of the present disclosure.
Figure 5C:
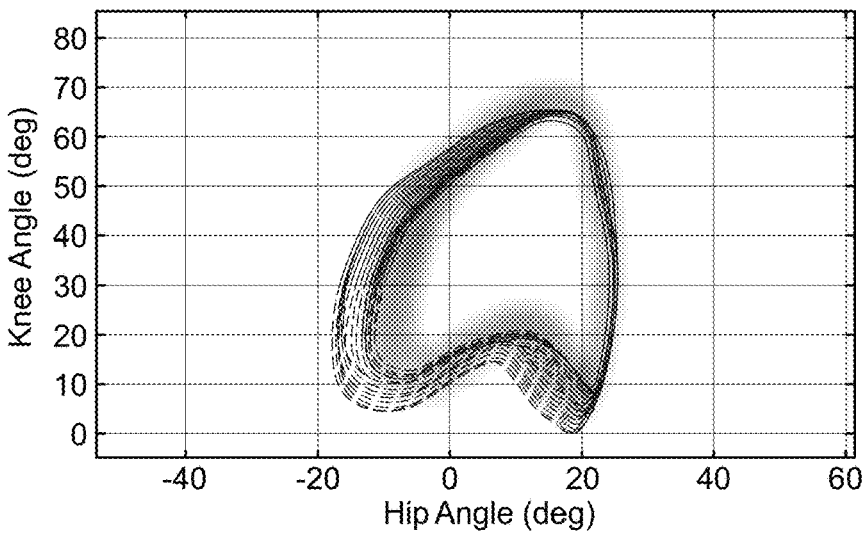
FIG. 5C shows exemplary leg motion data collected by an experimental methodology, according to an embodiment of the present disclosure.

FIGS. 5A-5C shows the respective hip and knee motion, for a representative subject (in this case Subject 2), corresponding to each of the three controllers. Specifically, the data corresponds to walking with the path-3 controller (shown in FIG. 5A), path-9 controller (shown in FIG. 5B), and flow controller (shown in FIG. 5C). Note that measured leg movement is shown in the dark traces, with swing phase in solid line and stance phase in dashed. The desired path and deadband are shown in grey. As shown in FIGS. 5A-5C, the path-9 controller (FIG. 5B) and flow controller (FIG. 5C) provided similar levels of guidance, while the path-3 controller (FIG. 5A) demonstrated increased guidance error.

Figure 6:
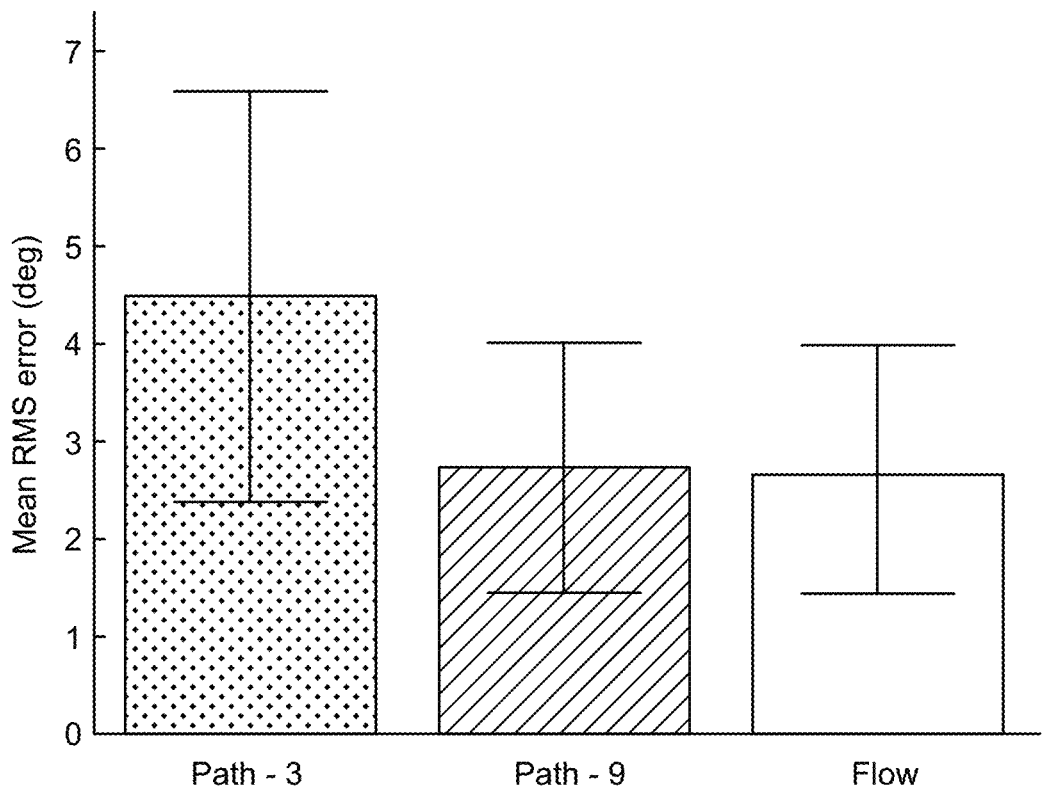
FIG. 6 shows exemplary mean RMS error data collected by an experimental methodology, according to an embodiment of the present disclosure.

The error for each trial in this experimental protocol is given by (3) (discussed above with respect to the flow controller), and the RMS of this error over each trial provides an indication of the efficacy of the controller in providing guidance. The mean RMS error values for all steps and all subjects for each controller is summarized in FIG. 6. Specifically, for 656, 664, and 667 strides corresponding to path-3, path-9, and flow, respectively, the average RMS error and corresponding standard deviations were 4.5+2.1, 2.7+1.3, and 2.6+1.3 deg, respectively. Each subject's data were tested for normal distribution using a Kolmogorov-Smirnov test, and were found to be normally distributed within a 95% confidence interval (with the exception of Subject 5, path-3 data, which was found to be normally distributed with a 90% confidence interval). As such, all trials were considered sufficiently normal to enable use of paired t-tests for testing of differences in means within each subject. As such, paired t-tests were performed comparing each subject's three overground walking conditions, which indicated for all subjects that the differences between the flow and path-3 RMS guidance errors were significant (p<0.05), while the differences in error between flow and path—were not. The error bars represent one standard deviation from the norm.

Figure 7:
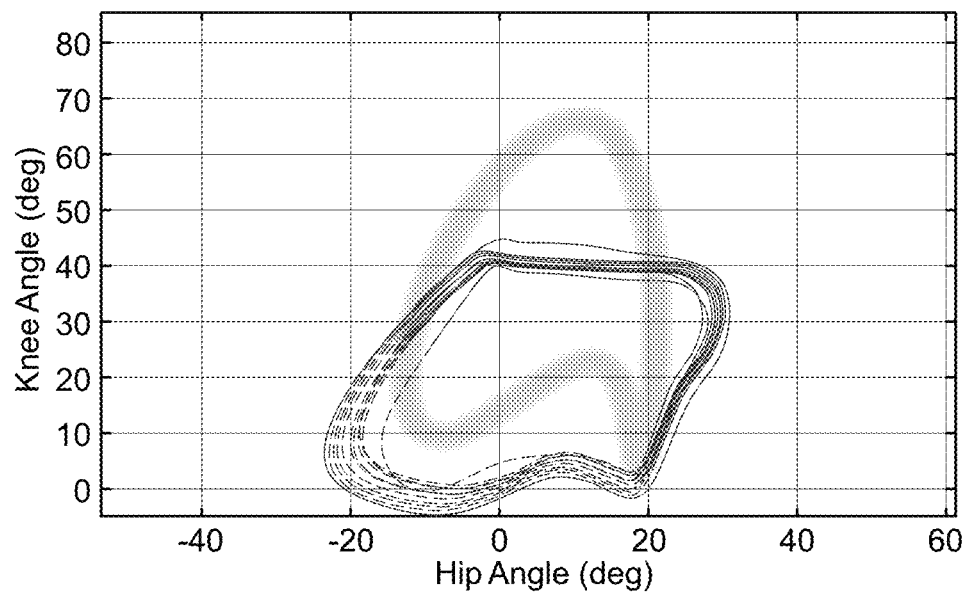
FIG. 7 shows exemplary hip and knee angle data collected by an experimental methodology for disturbance gain, according to an embodiment of the present disclosure.

FIG. 7 shows hip and knee angle from the right leg from a representative subject and trial (Subject 1, path-3 controller) of the disturbance response assessment experiment.

Figure 8:
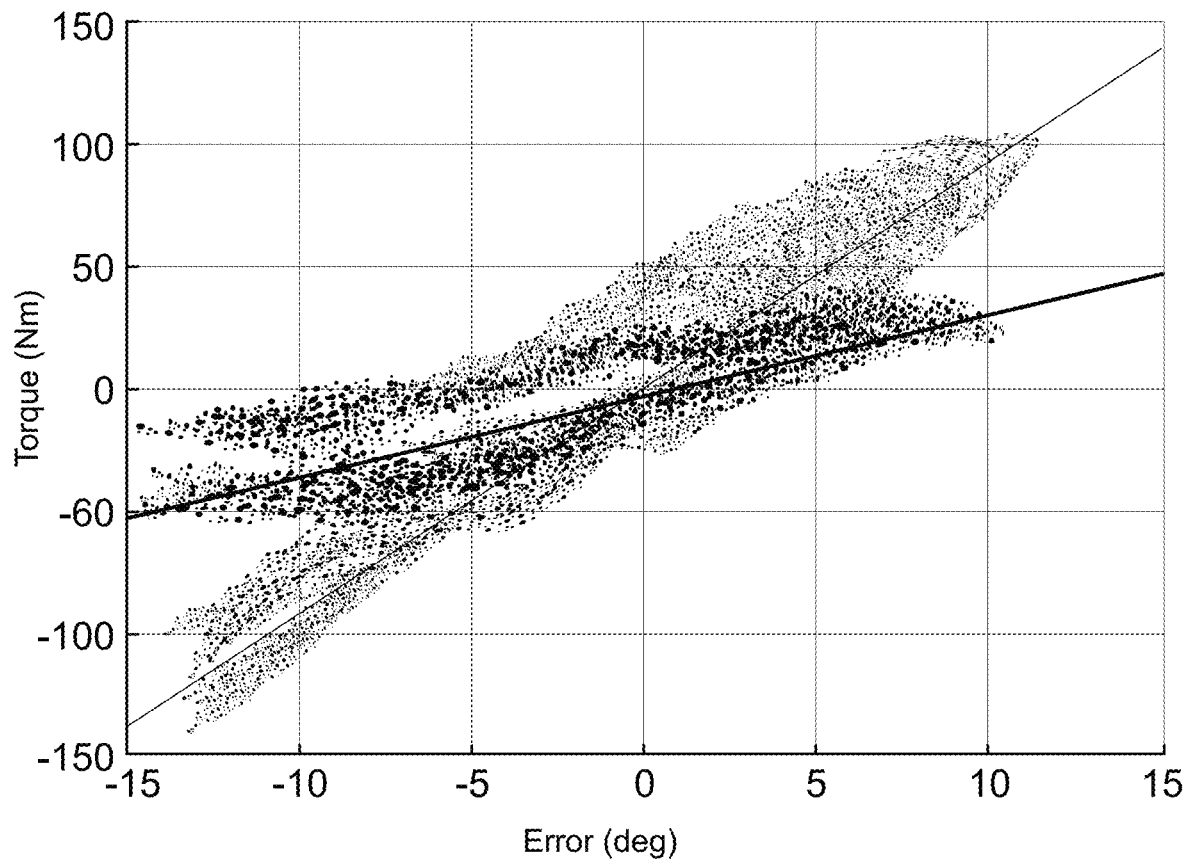
FIG. 8 shows exemplary torque response to deviations from the reference movement path collected by an experimental methodology, according to an embodiment of the present disclosure.

FIG. 8 shows a plot of all torque versus path error samples for all subjects and all control conditions while conducting the ROM-limiting experiments. FIG. 8 depicts the error (as calculated with respect to (3)) from the desired path along the x-axis, and the resulting torque from the respective controller on the y-axis, with the path-3 (lightest color), path-9 (medium color), and flow controller (darkest color) data, respectively. A least-squares linear approximation of each set of data results in the linear parameters for each case given in Table 2. The slope of each line provides the approximate disturbance gain corresponding to each controller (i.e., the torque on the user resulting from a given deviation). As shown in Table 1, while the path-3 and flow slopes are similar (lightest and darkest lines in FIG. 8), the path-9 disturbance slope is approximately three times greater than that of the disclosed flow controller, and thus is considerably less forgiving to path error relative to the other two. In summary, therefore, the disclosed flow controller was able to provide improved guidance with greater disturbance, relative to the path controller formulations. Additional characteristics of the flow control approach are discussed below.

TABLE 2

Error Response Interpolation Coefficients

| Controller | Slope (Nm/deg) | Offset (Nm) |
|---|---|---|
| Path-3 | 3.1 | 1.1 |
| Path-9 | 9.3 | 1.6 |
| Flow | 3.3 | −2.4 |

First-Order Homogeneous Response

Conventional robot controllers are characterized primarily or in part by a homogeneous position-dependence. By contrast, the disclosed flow controller is characterized by a homogeneous velocity-dependence. In the case that these respective controllers act on a primarily inertial system, the conventional controller provides a nominally second-order homogeneous response, while the disclosed flow-controlled system provides a first-order response. Therefore, the flow-controlled motion of the disclosed flow-controlled system is fundamentally devoid of oscillation. By contrast, the existence of oscillation in a conventional path-controlled leg depends on the system parameters. Exemplary system parameters causing oscillation in a conventional controller include (1) the stiffness control gains, (2) the damping control gains, and (3) any other inertial properties of the system.

Providing Guidance and Assistance

The present disclosure provides a cooperative controller with both guidance and assistance with regard to the cooperative task. Guidance refers to facilitating or promoting a given motion, but not otherwise directly adding power to the movement. Assistance is the complement to guidance, which is adding power along the direction of movement. The disclosed flow controller combines both guidance and assistance components into a single control component, as encoded by the shape of the flow field, such that there is no mechanistic distinction between the two. Rather, the extent of guidance relative to assistance is determined by the shape of the velocity field, and the drag characteristics of the simulated object within the field (e.g., the relative magnitudes of guidance versus assistance efforts can be influenced by employing separate drag coefficients for the normal versus tangential directions, relative to flow streamlines). This is similar to the idea of a stick in a stream aligning with the streamlines, due to the fact that the drag coefficients in the axial and transverse directions are substantially different.

Directionality of Error Correction

In the presence of a positional discrepancy between the human motion and robot motion, the corrective effort generated by the disclosed flow controller is dependent on both the configuration (positional difference) and the rate of change of configuration (i.e., the configuration velocity). In the case that a positional error exists in the disclosed flow controller, but the actual position is moving back towards the desired position with an appropriate velocity, no corrective action will be applied, regardless of the magnitude of configuration error. In other words, the disclosed flow controller considers not only the configuration error, but also the configuration velocity, and will not correct movement if the velocity indicates that the virtual object is converging toward the reference movement path. Table 1 below shows exemplary error movement data of the disclosed flow controller versus conventional path controllers.

Dependence on Reference Velocity

The disclosed flow controller requires selection of a reference velocity (i.e., a nominal velocity must be employed for the flow field), which in effect establishes a nominal rate of movement through the desired positional path (i.e., the reference movement path). In the case that the user is moving along the desired configuration path at the desired velocity, no assistive torque or force will be imparted. In the case that the user moves more slowly, the virtual flow field will "pull" the user along the desired positional path, in a similar manner to a stream pulling a floating object downstream. Similarly, if the user movement is faster than the reference velocity, the controller will impart an associated drag to slow it. Therefore, the disclosed flow controller is much more forgiving with respect to time deviation than would be a conventional position-dependent assistive controller, since the latter fundamentally integrates velocity error over the timespan of the actual motion; this velocity error integration of conventional controllers results in substantially larger corrective efforts for a continuous velocity error. By contrast, the disclosed flow controller, imposes a corrective torque or force associated strictly with the instantaneous velocity error. As such, the disclosed flow controller easily allows deviation from a nominal "expected" movement duration in practice.

While various examples of the present invention have been described above, it should be understood that they have been presented by way of example only, and not limitation. Numerous changes to the disclosed examples can be made in accordance with the disclosure herein without departing from the spirit or scope of the invention. Thus, the breadth and scope of the present invention should not be limited by any of the above described examples. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular examples only and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

What is claimed is:

1. A control method for generating a desired movement in a robotic system including a plurality of controllable joints and a controller, the control method comprising:
   determining a configuration space for the robotic system, the configuration space including dimensionality equal to a number of the plurality of controllable joints;
   determining, at the controller, a reference movement path within the configuration space;
   assigning a plurality of streamlines in the configuration space to yield a flow field, each of the plurality of streamlines converging to the reference movement path and comprising a velocity magnitude;
   measuring an actual velocity vector in the configuration space based on a plurality of velocity components corresponding to the plurality of controllable joints;
   determining an error velocity vector based on a difference between the actual velocity vector and selected streamlines in the plurality of streamlines, the selected streamlines having a corresponding location in the configuration space to the actual velocity vector; and
   applying a total control vector at the plurality of controllable joints, by the controller, based on the error velocity vector,
   wherein applying the total control vector further comprises:
      receiving, at the controller, at least one drag coefficient;
      determining the total control vector based on a product of the at least one drag coefficient and the error velocity vector; and
      applying torque or force at each joint of the plurality of controllable joints based on the total control vector.

2. The method of claim 1, wherein the applied total control vector for each joint comprises a dot product of the total control vector and an axis associated with each joint.

3. The method of claim 1, wherein the applied total control vector is strictly dissipative relative to the flow field.

4. The method of claim 1, wherein streamlines in the plurality of streamlines include identical velocity magnitudes.

5. The method of claim 1, wherein the at least one drag coefficient further comprises:
   an axial drag coefficient in a first direction, the first direction being tangential to the plurality of streamlines; and
   a lateral drag coefficient in a second direction, the second direction being normal to the plurality of streamlines.

6. The method of claim 5, wherein determining the total control vector further comprises:
   identifying a first component of the error velocity vector and a second component of the error velocity vector, wherein the first component of the error velocity vector is in the first direction and the second component of the error velocity vector is in the second direction;
   determining a first component of the total control vector and a second component of the total control vector, wherein the first component of the total control vector is equal to a product of the axial drag coefficient and the first component of the error velocity vector, and wherein the second component of the total control vector is equal to a product of the lateral drag efficient and the second component of the error velocity vector; and
   determining a combined control vector comprising a vector sum of the first component of the total control vector and the second component of the total control vector.

7. The method of claim 6, wherein applying the total control vector for each joint comprises a dot product of the combined control vector and a controllable degree of freedom associated with each joint.

8. A control method for generating a desired movement in a robotic system including a plurality of joints and a controller, the control method comprising:
   determining a configuration space for the robotic system, the configuration space including dimensionality equal to a number of the plurality of joints;
   determining, at the controller, a reference movement path within the configuration space;
   assigning a plurality of streamlines in the configuration space to yield a flow field, each of the plurality of streamlines converging to the reference movement path and comprising a velocity magnitude;
   measuring an actual velocity vector in the configuration space based on a plurality of velocity components corresponding to controllable joints of the plurality of joints;
   determining an error velocity vector based on a difference between the actual velocity vector and selected streamlines in the plurality of streamlines, the selected streamlines having a corresponding location in the configuration space to the actual velocity vector;
   applying a total control vector at the controllable joints in the plurality of joints, by the controller, based on the error velocity vector, wherein applying the total control vector further comprises:
  receiving, at the controller, at least one drag coefficient;
  determining the total control vector based on a product of the at least one drag coefficient and the error velocity vector; and
  applying torque or force at each controllable joint of the controllable joints based on the total control vector.

9. The method of claim 8, wherein the applied total control vector for each controllable joint comprises a dot product of the total control vector and an axis associated with each controllable joint.

10. The method of claim 8, wherein the applied total control vector is strictly dissipative relative to the flow field.

11. The method of claim 8, wherein streamlines in the plurality of streamlines include identical velocity magnitudes.

12. The method of claim 8, wherein the at least one drag coefficient further comprises:
  an axial drag coefficient in a first direction, the first direction being tangential to the plurality of streamlines; and
  a lateral drag coefficient in a second direction, the second direction being normal to the plurality of streamlines.

13. The method of claim 12, wherein determining the total control vector further comprises:
  identifying a first component of the error velocity vector and a second component of the error velocity vector, wherein the first component of the error velocity vector is in the first direction and the second component of the error velocity vector is in the second direction;
  determining a first component of the total control vector and a second component of the total control vector, wherein the first component of the total control vector is equal to a product of the axial drag coefficient and the first component of the error velocity vector, and
  wherein the second component of the total control vector is equal to a product of the lateral drag efficient and the second component of the error velocity vector; and
  determining a combined control vector comprising a vector sum of the first component of the total control vector and the second component of the total control vector.

14. The method of claim 13, wherein applying the total control vector for each controllable joint comprises a dot product of the combined control vector and a controllable degree of freedom associated with each controllable joint.

* * * * *